(12) United States Patent
Abdoulaye et al.

(10) Patent No.: US 12,321,269 B2
(45) Date of Patent: Jun. 3, 2025

(54) TECHNIQUES FOR RUNTIME PROTOCOL CONFORMANCE CACHE FOR THIRD PARTY

(71) Applicant: APPLE INC., Cupertino, CA (US)

(72) Inventors: Mohamadou A. Abdoulaye, San Francisco, CA (US); Peter Cooper, San Jose, CA (US); Michael J. Ash, McLean, VA (US); Davide Italiano, San Francisco, CA (US); Nick Kledzik, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 112 days.

(21) Appl. No.: 18/085,475

(22) Filed: Dec. 20, 2022

(65) Prior Publication Data

US 2023/0393980 A1 Dec. 7, 2023

Related U.S. Application Data

(60) Provisional application No. 63/365,872, filed on Jun. 5, 2022.

(51) Int. Cl.
*G06F 12/0802* (2016.01)
*G06F 16/22* (2019.01)

(52) U.S. Cl.
CPC ...... *G06F 12/0802* (2013.01); *G06F 16/2272* (2019.01); *G06F 2212/603* (2013.01)

(58) Field of Classification Search
CPC ............. G06F 12/0802; G06F 12/0875; G06F 16/2272; G06F 16/9014; G06F 2212/1024; G06F 2212/222; G06F 2212/452; G06F 2212/603; G06F 9/44521
USPC ........................................................ 711/141
See application file for complete search history.

(56) References Cited

U.S. PATENT DOCUMENTS

| | | | |
|---|---|---|---|
| 2004/0194112 A1* | 9/2004 | Whittenberger | G06F 16/258 719/310 |
| 2011/0200045 A1* | 8/2011 | Baehre | H04L 12/4633 370/392 |
| 2015/0127529 A1* | 5/2015 | Makhotin | G06Q 20/322 705/39 |

* cited by examiner

*Primary Examiner* — Hashem Farrokh
(74) *Attorney, Agent, or Firm* — Kilpatrick Townsend & Stockton LLP

(57) ABSTRACT

Techniques may include receiving a first request for a conformance check for a conformance pair, the conformance pair include a variable type and a particular protocol. The first request can identifying a first pointer. The technique can include determining a conformance check result is not cached for the conformance pair using the first pointer. In response to determining that the conformance check result is not cached for a variable, the electronic device may include performing the conformance check for the conformance pair and storing a result of the conformance check in an index table in persistent memory in association with at least a portion of bits in the first pointer. The technique can include referencing the index table on subsequent requests for a conformance check.

20 Claims, 8 Drawing Sheets

| PROTOCOL (404) | TYPE (406) | CONFORMANCE (408) |
|---|---|---|
| 010101111110 | 011111001011 | Descriptor |
| 110100111010 | 011111001011 | Descriptor |
| 111101000110 | 111000000101 | Descriptor |
| 110110110110 | 010011001011 | Descriptor |
| 001001001001 | 101100111001 | Null |
| 111100111100 | 100101110111 | Descriptor |
| 010101111110 | 111000111000 | Null |
| 111100111100 | 111000111000 | Descriptor |
| 111000111000 | 111100111100 | Descriptor |
| 111000111000 | 001001001001 | Null |
| 100101110111 | 101100111010 | Descriptor |
| 101100111001 | 110110110110 | Descriptor |

RECEIVE A FIRST REQUEST FOR A CONFORMANCE CHECK FOR A CONFORMANCE PAIR, THE CONFORMANCE PAIR INCLUDE A VARIABLE TYPE AND A PARTICULAR PROTOCOL, THE FIRST REQUEST IDENTIFYING A FIRST POINTER
705

DETERMINE A CONFORMANCE CHECK RESULT IS NOT CACHED FOR THE CONFORMANCE PAIR USING THE FIRST POINTER, WHEREIN DETERMINING THE CONFORMANCE CHECK RESULT IS NOT CACHED
710

IN RESPONSE TO DETERMINE THAT THE CONFORMANCE CHECK RESULT IS NOT CACHED FOR A VARIABLE, PERFORMING THE CONFORMANCE CHECK FOR THE CONFORMANCE PAIR AND STORING A RESULT OF THE CONFORMANCE CHECK IN AN INDEX TABLE IN PERSISTENT CACHE IN ASSOCIATION WITH AT LEAST A PORTION OF BITS IN THE FIRST POINTER
715

RECEIVE A SECOND REQUEST FOR THE CONFORMANCE CHECK FOR THE CONFORMANCE PAIR, THE SECOND REQUEST INCLUDING A SECOND POINTER
720

DETERMINE THAT THE CONFORMANCE CHECK RESULT IS CACHED IN THE PERSISTENT CACHE FOR THE CONFORMANCE PAIR
725

IN RESPONSE TO DETERMINE THAT THE CONFORMANCE CHECK RESULT IS CACHED FOR THE CONFORMANCE PAIR, RETRIEVING THE CONFORMANCE CHECK RESULT FROM THE INDEX TABLE IN THE PERSISTENT CACHE, WHEREIN RETRIEVING THE CONFORMANCE CHECK RESULT USES AT LEAST A PORTION OF THE BITS IN THE SECOND POINTER
730

TECHNIQUES FOR RUNTIME PROTOCOL CONFORMANCE CACHE FOR THIRD PARTY

CROSS-REFERENCES TO RELATED APPLICATIONS

This application claims the benefit to U.S. Provisional Application No. 63/365,872, filed Jun. 5, 2022, entitled "Techniques For Runtime Protocol Conformance Cache For Third Party Applications," the disclosures which is incorporated by reference in its entirety and for all purposes.

BACKGROUND

Computer applications can be generated using a general-purpose, multi-paradigm, compiled programming language. Static computer programming languages such as C, C++, Objective-C, and other C dialects typically require application programs to be compiled and linked before they are executable. According to the traditional static application development method, there can be two main steps to building an application: 1) a compiler reads each source code file and produces an object file for each of the source code files and 2) a linker reads all the object files and combines them into a single application program. Dynamic linking allows for substitution of new components without rebuilding the application. For example, a developer may build for one version of an operating system (e.g., iOS 14), and link to that operating system's (e.g., iOS 14) libraries. As the device is upgraded, the application may be run on an updated operating system (e.g., iOS 15). Dynamic linking can provide the new iOS 15 libraries when the application executes on iOS 15.

Dynamically linking statically compiled languages can reduce some of the linker overhead described above. One dynamic linking technique calls for dynamically linking object file libraries at run-time. In some cases, when these applications run, a protocol conformance check (e.g., a runtime check) can be slow and result in poor user experience. For example, such conformance checks can result in 100+ milliseconds of App launch time delay.

BRIEF SUMMARY

This disclosure relates to reducing launch time for third party apps by storing results for typical launch-time operations in a non-volatile memory. One such pre-launch operation can be a protocol conformance check. A protocol conformance check can determine whether a given variable type conforms to a particular protocol. The result of the conformance check can be saved in a table that describes that type's conformance to that protocol, or NULL if the type does not conform. Such a table can be indexed for fast retrieval. An initial search process (e.g., when an app is first downloaded or run the very first time) can perform a linear scan of all known conformance descriptors in the process. To speed up repeated checks, the runtime system using a dynamic linker/loader can generate and index the table using a protocol and a type as a combined key for searching the table. The table and related data for accessing can utilize pointers to reduce the size of the table. The lowest bits of the pointer in the page do not change regardless of where it is stored in memory and therefore the lowest bits can be used for efficient indexing because the lowest bits remain valid even when the locations can vary across launches.

In one general aspect, a method may include receiving a first request for a conformance check for a conformance pair. The conformance pair can include a variable type and a particular protocol. The first request can identify a first pointer. The method can include determining that a conformance check result is not cached for the conformance pair using the first pointer. In response to determining that the conformance check result is not cached for a variable, the method can include performing the conformance check for the conformance pair and storing a result of the conformance check in an index table in persistent cache in association with at least a portion of bits in the first pointer. The method can include receiving a second request for the conformance check for the conformance pair, the second request including a second pointer. The method can include determining that the conformance check result is cached in the persistent cache for the conformance pair. In response to determining that the conformance check result is cached for the conformance pair, the method can include retrieving the conformance check result from the index table in the persistent cache. In various embodiments, the method can include retrieving the conformance check result uses at least a portion of the bits in the second pointer. Other embodiments of this aspect include corresponding computer systems, apparatus, and computer programs recorded on one or more computer storage devices, each configured to perform the actions of the methods.

Implementations may include one or more of the following features. In various embodiments, the portion of the bits can be shared across one or more conformance pairs, resulting in a plurality of matching conformance pairs in the index table. In various embodiments, the method can include identifying the conformance pair from the plurality of matching conformance pairs. The conformance pair can include a type pointer and a protocol pointer. The persistent cache can persist across application launches. The conformance check may include searching for a conformance that matches a given type and protocol. The method can include producing a witness table that describes the given type's conformance to that protocol or a null value if the given type does not conform to the protocol. The method can include storing a hash table mapping type descriptor and protocol pairs to protocol conformance descriptors. The method can include generating one or more witness tables into a shared cache. The method can include generating one or more generic witness tables for pre-specialized metadata. The method can include caching one or more witness tables using a protocol and a type as a key. The method can be performed by a dynamic linker that is configured to perform one or more processes and persist results of the one or more processes in a non-volatile storage. The one or more processes can be specified by an application or run-time. The application or run-time can retrieve the results from the non-volatile storage, and the results are persisted across launches of the application and/or runtime. Implementations of the described techniques may include hardware, a method or process, or a computer tangible medium.

Other embodiments of the disclosure are directed to systems, apparatus, and computer readable media associated with methods described herein. In one embodiment, the computer readable medium contains instructions for receiving data and analyzing data, but not instructions for directing a machine to create the data. In another embodiment, the computer readable medium does contain instructions for directing a machine to create the data. In one embodiment, a computer program product comprises a computer readable medium storing a plurality of instructions for controlling a processor to perform an operation for methods described herein. Embodiments are also directed to computer systems configured to perform the steps of any of the methods described herein, potentially with different components performing a respective step or a respective group of steps.

Reference to the remaining portions of the specification, including the drawings and claims, will realize other features and advantages of embodiments of the present disclosure. Further features and advantages, as well as the structure and operation of various embodiments of the present disclosure, are described in detail below with respect to the accompanying drawings. In the drawings, like reference numbers can indicate identical or functionally similar elements.

BRIEF DESCRIPTION OF THE DRAWINGS

FIG. 4 illustrates an exemplary index table.

FIG. 7 is a flow chart of a process, according to an example of the present disclosure.

DETAILED DESCRIPTION

Figure 1:
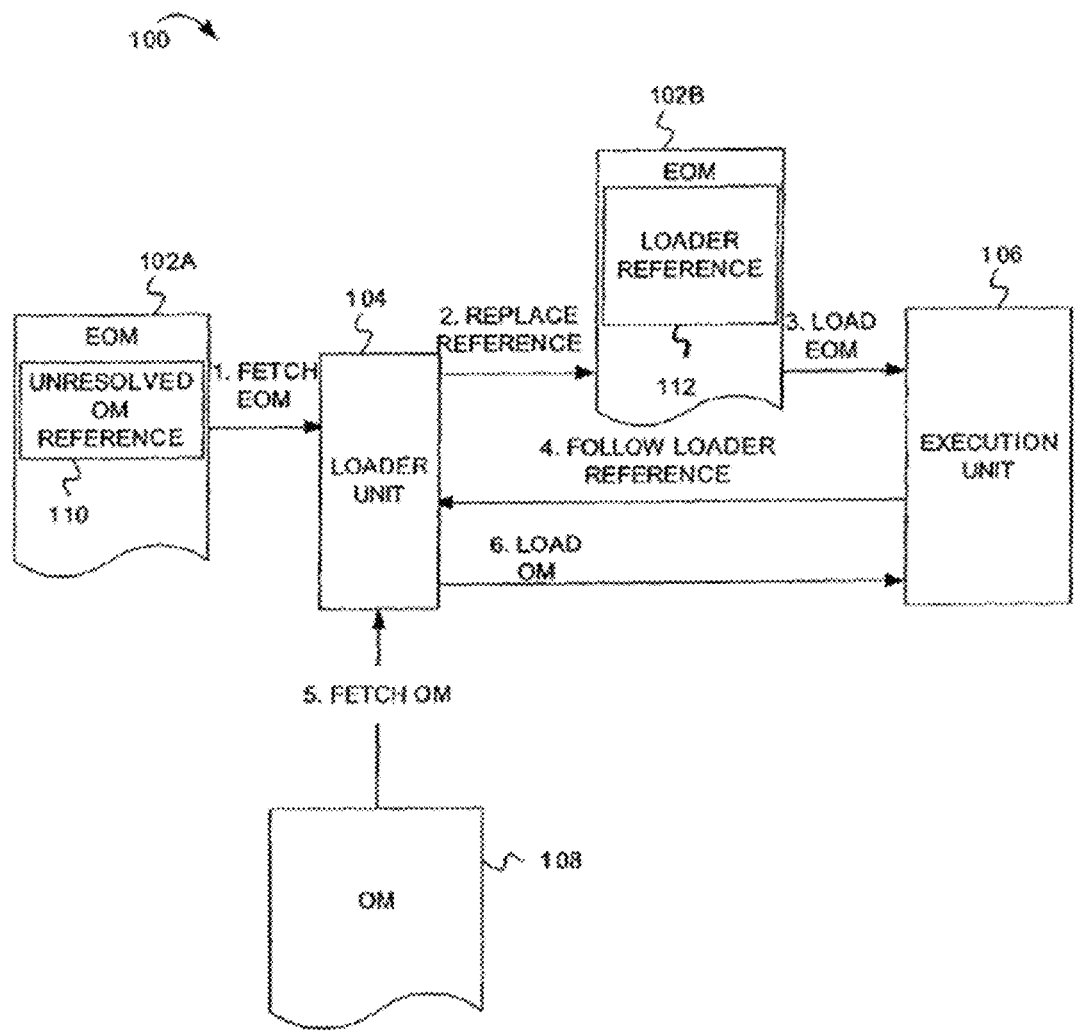
FIG. 1 is a data flow diagram illustrating data flow and operations for dynamically loading and executing a set of object modules.

A runtime conformance check can be performed many times when an application is loaded on an electronic device. This process can be slow and performance can be gained by improving the process. In various embodiments, a dynamic linker/loader can be running on an operating system. The dynamic linker/loader collectively refer to a module that performs linking and loading functionality. When an application calls a library, the application (or a runtime process) can communicate with the dynamic linker/loader. The dynamic linker/loader can identify the pointers to the correct system library code. The dynamic linker/loader can perform a protocol check at runtime. A problem is that such protocol checks can slow down an execution of the application.

In previous techniques, a table (e.g., a protocol conformance table) was created anew each time the App was launched. The table can be known as a conformance check result. According to the techniques described herein, the table can be persistently stored, and reused for each new launch, so that the application can launch faster. The reason the table can be reused is by storing memory offsets (low bits of pointers) that are page aligned, and thus do not change regardless of where the App is stored in memory for a current launch.

The existence of the table can be confirmed, e.g., as existing in metadata of the application when read from memory or persisted in system memory. A dynamic linker can insert pointers to library function calls into the application at runtime. When a dynamic link is encountered, a conformance check can be performed, by the runtime routine and the dynamic linker/loader.

The dynamic linker/loader can assist the Application call the correct functions from libraries at runtime. The only information that the dynamic linker/loader needs can be that there is a "libraryX" somewhere, which contains the functions "functionA" and "functionB." The dynamic linker/loader may have no knowledge of the details about "functionA" and "functionB" and does not need to. The dynamic linker/loader can know where to find the library, and can assist the App correctly call "functionA" or "functionB" as needed.

In the runtime routine there can be an extensive library (e.g., libSwift) that can include hundreds of functions that can be called by the Application. Usually, several different applications may need to call into the library for different functions. The dynamic linker/loader can access various different libraries that each can include their own function1, function2, function3, etc. The dynamic linker/loader can correctly determine the location in memory for the specific functions.

Protocol conformances (and their checks), can be one aspect of multiple internal details of a runtime routine performed by an electronic device. The runtime routine can set up a data structure in the library and allocate internal memory for internal logic. The dynamic linker/loader can be unaware of the runtime routine and can perform calling functions of the library (e.g., a libSwift) when the Application needs it. Here, some of the library functions can use the dynamic linker/loader to perform certain tasks. For example, the dynamic linker/loader can parse the executable and its dependent libraries at launch and store the results of in a table. Then, at runtime during the execution/lifetime of the process, when library routine would have normally performed the task of handling the data structures, e.g., doing that parsing, etc., the library routine can now instead query the dynamic linker/loader to determine whether or not the dynamic linker/loader has specific information about a protocol and type in everything it has parsed/computed before, so that the protocol conformance check can be performed faster.

That "querying" can be done through function calls into the dynamic linker/loader. The library routine can communicate to the dynamic linker/loader specifically which protocol and type that the library routine is looking information for, and the dynamic linker/loader can return an answer as the return value of the function. The library routine can then use the return value to continue doing the rest of its internal work. This function can be referred to as the dyld API.

Back to the table, the low bits can be used in a possible implementation of the protocol conformance checker in the dyld API. The library routine can use pointers as answers to the calls to the dyld API. The library routine can communicate pointers to the dynamic linker/loader as arguments for the queries. In various embodiments, the routine can be described as follows:

Pointer*getProtocolInfo(Pointer*type, Pointer*protocol)

The low bits can be taken from actual pointers sent to the dynamic linker/loader. The low bits can be used as entries in the table. The dynamic linker/loader can reuse the table across various launches and does not need to store full pointer addresses.

A linear or other type of scan can be for each type/protocol pair before the cache is populated. The runtime compiler can be specific to the type language in the executable, can create, according to an executable format file (e.g., Mach-O) a list of pointers to each protocol conformance record in the binary. The Mach-O format can provide the way the actual executables, libraries, every executable binary on a particular platform are structured. In that way, the kernel, and every piece of software (e.g., dynamic linker/loader, libSwift, etc.) knows how to parse, load, and do various operations on the executable binary's data. The dynamic linker itself can be a Mach-O binary, and the library routine (e.g., libSwift) can also be a Mach-O binary.

A conformance record can be generated for every type/protocol pair and allow the runtime process to determine which conformances are in the application. The scan of all conformances can be done for every loaded dynamic library in the application, including frameworks or system libraries like the programming language format (e.g., Swift) standard library itself. The table generated by the conformance check can be known as the conformance check result.

The speed of protocol conformance lookups can be dependent on the number of conformances in the subject App. The speed be influenced by how many open language libraries the App is linked to, and how many conformances the developer includes in the App code. A single conformance lookup is O(n) and looking up every possible conformance is O(n^2). This can result in poor performance of the App.

The first time the application performs a conformance check all the virtual memory for sections containing protocol runtime metadata are paged in. With potentially in excess of 100,000 conformances, this can be a significant cost and make the first conformance check much slower.

During a cache hit, the process can measure the time of accessing a hash map. The operation can be performed in a loop and the average time can be measured. This process can be very fast, about 0.0004 milliseconds. Once the cache is populated, protocol conformance checks may not be a major bottleneck to performance, that is why it can be particularly problematic during App launch when the cache is empty.

During a negative result, the runtime loop that runs for each conformance has an early return that avoids most of the work if the protocol being checked is not equal to the protocol in a conformance record. To test the impact of this, the time it takes to run a conformance check on a protocol that was not the one conformed to by the potentially 100,000+ generated classes can be measured.

A protocol conformance check can search for a conformance that matches the given type and protocol and produces a witness table which describes that type's conformance to that protocol, or NULL if the type does not conform. The conformance check then instantiates the witness table from this data.

The original search can be a coarse search using the lowest bits of the pointers. To speed up repeated checks, the runtime caches the witness table using at least one of a protocol and a type as the key. The witness table and related data for accessing it can be persisted in a cache between application launches by utilizing pointers for the check requests, and more specifically using the lowest bits in the pointers.

An example protocol conformance check can be used to determine if a variable definition in program code matches a "protocol" for the "type" associated with the variable. For example, a conformance check can be performed to determine if a variable of type "Array" conforms to a "Hashable" protocol. An example conformance protocol may state that an Array type conforms to a Hashable protocol only if all elements of the Array also conform to the Hashable protocol. These relationships can be defined by a Conformance Descriptor, which specifies a Protocol being confirmed to, and the type or type descriptor that is to conform to the protocol. To perform a protocol conformance check, the runtime searches all conformance descriptors for ones that match the protocol and type descriptor. If a conformance descriptor has generic requirements, it checks those against the type being checked.

The process performed by an electronic device can include receiving a first request for a conformance check for a conformance pair. The conformance pair can include a variable type and a particular protocol. The first request identifying a first pointer. In various embodiments, the pointer can be specific to the application but can change with each app launch. The pointer can indicate the first instruction of the App.

The process can include determining a conformance check result has not been previously cached for the conformance pair using the first pointer. In response to determining that the conformance check result is not cached for a variable, the process can perform the conformance check for the conformance pair and store a result of the conformance check in an index table in persistent cache in association with at least a portion of the bits in the first pointer. The process can include receiving a second request for the conformance check for the conformance pair, the second request including a second pointer. The process can include determining that the conformance check result is cached in the persistent cache for the conformance pair.

If the result of the conformance check was stored in association with the full pointer, when the app is relaunched with a different pointer, the cache lookup would fail, thus defeating the purpose of a cache that persists across app launch.

In response to determining that the conformance check result is cached for the conformance pair, the process can include retrieving the conformance check result from the index table in the persistent cache. The process can include retrieving the conformance check result uses at least a portion of the bits in the second pointer. Using the low bits of the pointer, which can be the same (other bits will change for each load of an app) to access the lookup. These bits should match the portion of the bits of the first pointer that were used as the index to the results of the conformance check. By virtue of indexing the conformance check by these bit portions, rather than the entire pointer, the cache cached data can be retrieved after app relaunch, even if the pointer has changed (because these bit portions would not change between app launches).

This method can be performed by the dynamic linker/loader. The open language format runtime can check a cache managed by the dynamic linker/loader. Presumably this allows the cache to be persisted between launches of the App.

I. Dynamic Loading

FIG. 1 is a data flow diagram illustrating data flow and operations for dynamically loading and executing a set of object modules, according to embodiments of the invention. In FIG. 1, the computer system 100 includes a linker/loader unit 104 and an execution unit 106, which perform operations for dynamically loading and executing a set of object modules. These operations and the associated data flow will be described in six stages.

An application program typically includes an executable object module and one or more additional object modules. Many of the additional object modules may not be called for execution when the application program is executed. For example, an application program's error-handling object modules will execute only when certain system errors occur. If the system errors do not occur, the application program's error-handling object modules do not execute. If a computer system loaded and resolved references for every object module prior to runtime, it could spend time processing object modules that are not executed.

According to embodiments, when an application program is launched, the computer system 100 loads only the object module that is currently needed for program execution. Because the computer system 100 does not load object modules until they are called at runtime, the computer system 100 does not spend time loading and resolving references for object modules that may never be called during program execution. As a result, the computer system 100 can launch applications relatively quickly.

Now turning to the six stages, during stage 1, the linker/loader unit 104 fetches an executable object module (EOM) 102A, which is part of an application program. The linker/loader unit 104 can be part of the runtime operations of the programming language. The executable object module 102A includes an unresolved reference to another object module (shown as unresolved OM reference 110). The unresolved object module reference 110 can be a call to a function that resides in the object module 108.

During stage 2, the linker/loader unit 104 replaces the unresolved object module reference 110 with a linker/loader reference 112, which is a reference to instructions within the linker/loader unit 104. Replacing the unresolved object module reference 110 with the linker/loader reference 112 allows the linker/loader unit 104 to resolve the unresolved object module reference and load the object module 108 at runtime. Thus, the computer system 100 postpones overhead associated with resolving references and loading object modules until runtime.

During stage 3, the linker/loader unit 104 loads the executable object module 102B into the execution unit 106, which begins executing the executable object module 102B.

During stage 4, while executing the executable object module 102B, the execution unit 106 encounters the linker/loader reference 112, which transfers program control to the linker/loader unit 104.

During stage 5, while the linker/loader unit 104 has program control, it determines that the unresolved object module reference 110 was a reference to object module 108 and it fetches the object module 108.

During stage six, the linker/loader unit 104 loads the object module 108 into the execution unit 106, which executes instructions and/or accesses data contained within the object module 108.

The protocol used in object modules can be used for indexing various protocol types used by the programming language. The performance gains by postponing resolving references and loading object modules until runtime can also be applied to other features of the programming languages.

Figure 2:
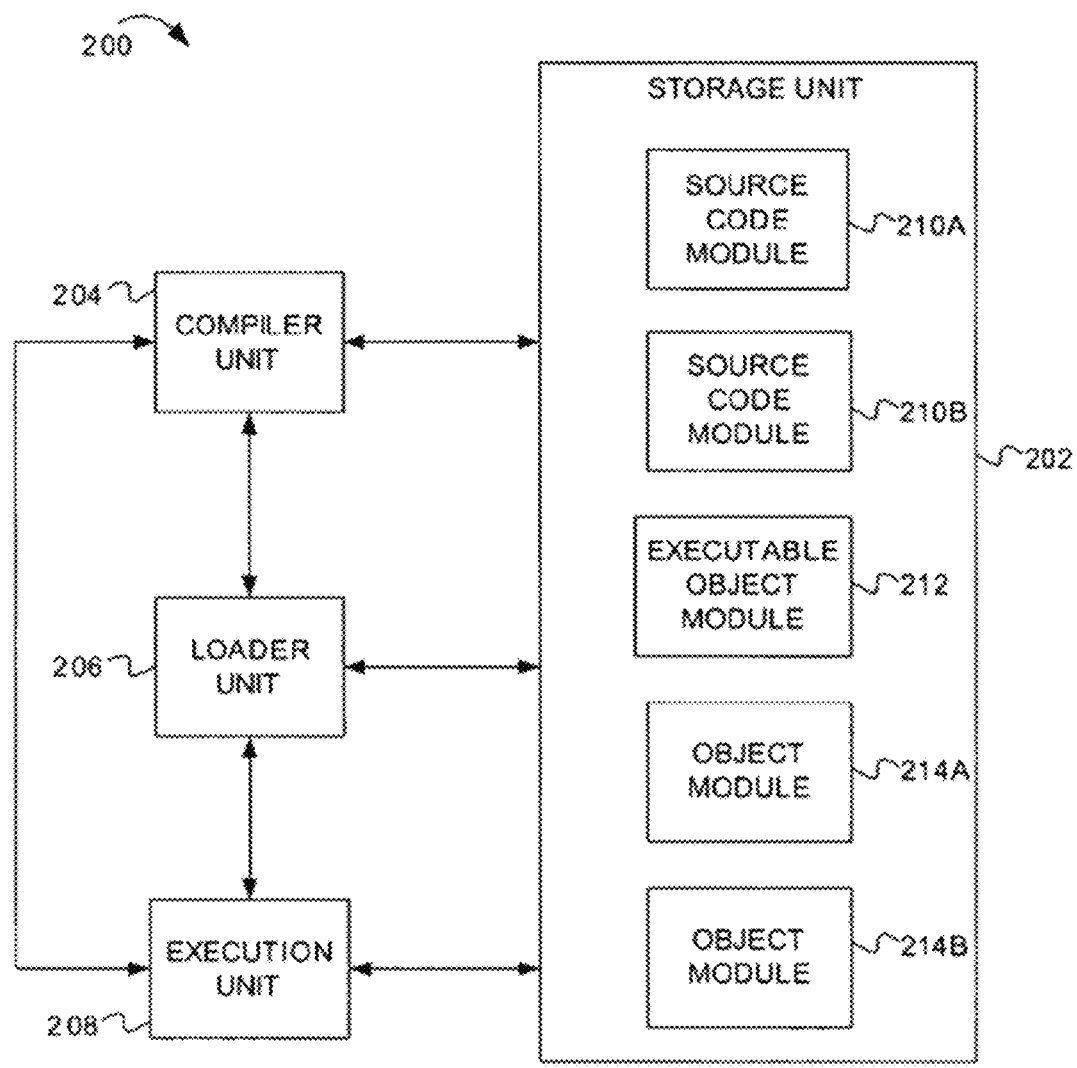
FIG. 2 is a block diagram illustrating a system for dynamically loading and executing object modules

FIG. 2 is a block diagram illustrating a system for dynamically loading and executing object modules, according to exemplary embodiments of the invention. As shown in FIG. 2, the system 200 includes a compiler unit 204, which is communicatively coupled with a linker/loader unit 206 and an execution unit 208. The linker/loader unit 206 is also communicatively coupled with the execution unit 208. The linker/loader unit 206 can also be the same as the linker/loader unit 104 as described for FIG. 1. The compiler unit 204, linker/loader unit 206, and execution unit 208 are all communicatively coupled to a storage unit 202. The storage unit includes source code modules 210A-210B, object modules 214A-214B, and an executable object module 212.

In one embodiment, the linker/loader unit 206 is a system module or system subroutine contained within an operating system (not shown) that is running on the execution unit 208. In one embodiment, the linker/loader unit 206 can be a dynamic linker/loader, which is a dynamic linker/loader available from Apple Computer, Inc. of Cupertino, Calif In one embodiment, the operating system is the Macintosh Operating System, which also available from Apple Computer, Inc.; however, embodiments are not limited to any particular operating system.

In one embodiment, the compiler unit 204 is a high-level language compiler. For example, in one embodiment, the compiler unit 204 compiles source code modules containing C programming language instructions. Alternatively, the compiler unit 204 compiles other statically compiled programming languages such as any dialect of the C programming language, including C++ and Objective C. Alternatively, the compiler unit 204 can compile any other suitable statically compiled programming language. In one embodiment, the compiler unit includes Xcode, which is part of the Mac OS X Development Environment. Mac OS X Development Environment is available from Apple Computer, Inc.

In one embodiment, the execution unit 208 includes any processors and memory devices (e.g., see FIG. 7—processor(s) 718 and memory unit 702) needed for executing an object module (i.e., an application program). In one embodiment, the storage unit 202 is a secondary storage device such as a disk drive or flash RAM device. Alternatively, the storage unit 202 can include any other suitable storage device.

In one embodiment, the source code modules 210A-210B include high-level programming language instructions written in a statically compiled programming language such as C, C++, Objective C, Swift, or any other suitable programming language. In one embodiment, the source code modules 210A-210B are text files, while in alternative embodiments, they are stored in any other suitable file format. According to one embodiment, the object modules 214A-214B are files in the Mach-O object format. According to embodiments, the storage unit 202 can include any number of source code modules and object modules.

The functional units (e.g., the compiler unit 204, linker/loader unit 206, etc.) of the system 200 can be integrated or divided, forming a lesser or greater number of functional units. Moreover, the functional units can be communicatively coupled using any suitable communication method (e.g., message passing, parameter passing, and/or signals through one or more communication paths etc.). Additionally, the functional units can be connected according to any suitable interconnection architecture (fully connected, hypercube, etc.). Any of the functional units used in conjunction with embodiments of the invention can include machine readable media including instructions for performing operations described herein. Machine-readable media include any mechanism that provides (i.e., stores and/or transmits) information in a form readable by a machine (e.g., a computer). For example, a machine-readable storage medium includes read only memory (ROM), random access memory (RAM), magnetic disk storage media, optical storage media, and flash memory devices. Examples of a machine-readable propagation medium include electrical, optical, acoustical or other forms of propagated signals (e.g., carrier waves, infrared signals, digital signals, etc.) According to embodiments of the invention, the functional units can be other types of logic (e.g., digital logic) for executing the operations described herein.

The linker/loader unit 206 functionality described above can be applied to other functions in the programming language.

II. Conformance Checks

Protocol conformance checks can be performed when the runtime features of an operating system check to see if a variable conforms to a protocol. References to unavailable protocol conformances can be diagnosed as errors. A protocol conformance check can search for a conformance that matches a given type and protocol, and produces an index table (e.g., a witness table) which describes that type's conformance to that protocol or a NULL if the type does not conform.

Figure 3:
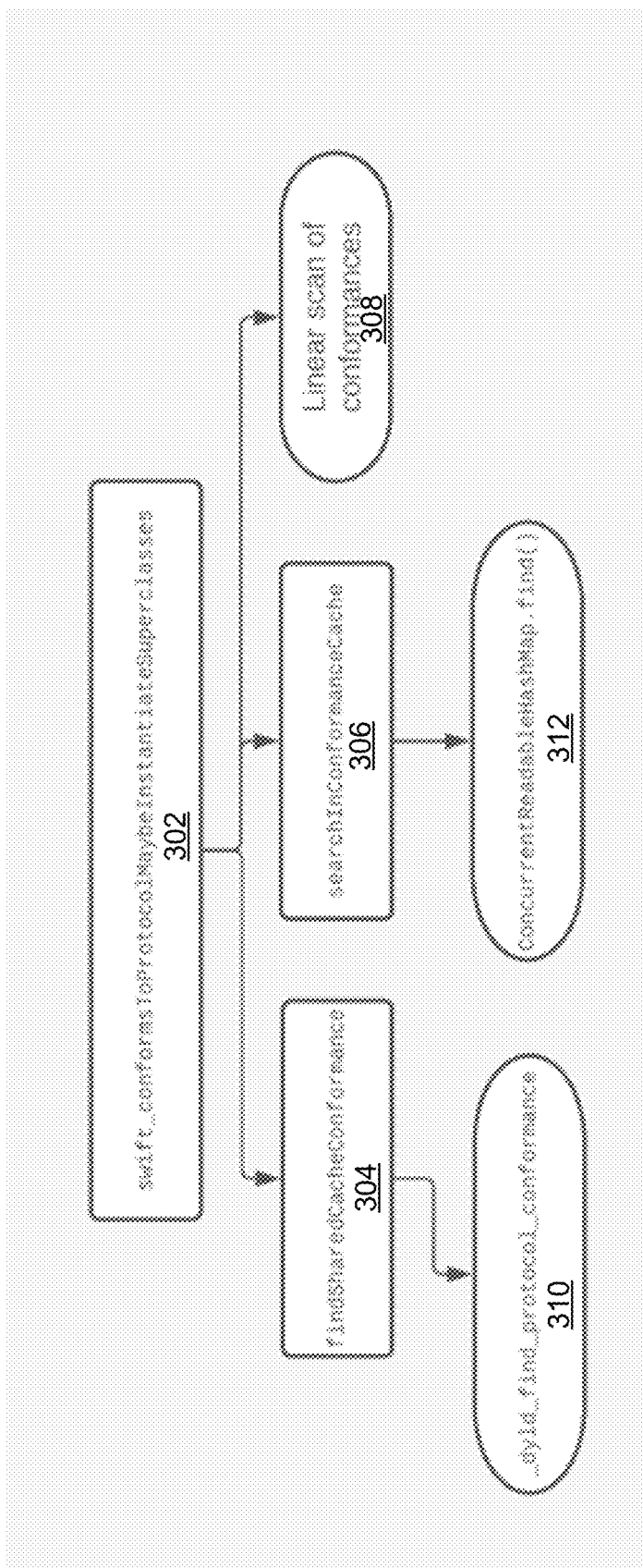
FIG. 3 illustrates an exemplary path for a particular function.

FIG. 3 illustrates an exemplary path for a particular function 302 (e.g., instantiate superclasses function) during the performance of a conformance check. FIG. 3 illustrates three high-level paths through the function, creating a two-level cache followed by a slower full search for the conformance. FIG. 3 can be used to visualize where most of the time is spent during startup. The first level can include a shared cache conformance 304, a search in conformance cache 306, and a linear scan of conformances 308. The second level can include using a dynamic linker/loader 310 to find protocol conformances and a readable hash map 312 of conformances. The readable hash map 312 allows a cache to be persisted between launches of the App. Looking at the definition of the cache key we can see it can be based on the conforming type and the protocol. This means the cache key can be specific to this type/protocol pair, multiple conformance checks for the same protocol but different types (or vice versa) will not hit the cache. This can also be verified with symbolic breakpoints.

The cache key can be specific to a type/protocol pair, multiple conformance checks for the same protocol but different types (or vice versa) will not hit the cache. A linear scan of the libraries can be a worst case for App start delay, but it can be done for each type/protocol pair before the cache is populated. The speed of protocol conformance lookups can be dependent on the number of conformances in the given App. This can be influenced by how many libraries the App is linked to, and how many conformances the App includes in the code. For example, Uber's App can have 411200 byte protocol conformance section. If each 4 bytes is a relative pointer this can result in 102,800 conformances. This can result in delay in searching these conformances without use of techniques to speed up the search.

III. Persistent Index Table for Performing Conformance Checks

Previously, the runtime library of the operating system would need to locate a witness table when conducting performance checks. Generating these witness tables could involve linear scanning that would delay App launch on every launch. The techniques described herein create an index table that can be persistent because it is stored in a non-volatile memory (e.g., on a disk drive) and can be reloaded into working memory when needed.

The index table can include certain memory offsets for protocol pointers, where the memory offsets are aligned to the page boundaries when the application is loaded into memory. In this manner, the table can be re-used since the offsets are relative to an internal page boundary and thus stay the same regardless of where in memory the application is stored. By enabling reuse of the index table, the delay in performing conformance checks can be greatly reduced. The persistent table can be stored with the Application itself FIG. 4 illustrates an exemplary index table 400. The index table 400 can be accessed by the runtime routine to determine if a variable conforms to a protocol. The index table 400 can list a predetermined number (e.g., 12 bits) of the low bits 402 of each of a set of pointer to function calls, which corresponds to each entry for protocol 404 and type 406 for the variable.

A protocol can define a blueprint of methods, properties, and other requirements that suit a particular task or piece of functionality. The protocol can then be adopted by a class, structure, or enumeration to provide an actual implementation of those requirements. Conformance can require an explicit declaration of conformance, in addition to satisfying the requirements. Therefore, just satisfying the requirements may not be sufficient. A protocol can require any conforming type to provide an instance property or type property with a particular name and type. The protocol may not specify whether the property should be a stored property or a computed property but only specify the required property name and type. The protocol also specifies whether each property must be gettable or gettable and settable. An example protocol listed in the table 400 can be "Hashable." Various other protocols can be used that are listed simply as Protocol-B through Protocol-L.

Protocols can be used as types 406. The allowed types 406 can include a parameter type or a return type 406 in a function, method, or initializer. The type 406 can be a constant, a variable, or a property. The type 406 can include items in an array, dictionary, or other container. Example types 406 can include, FullNamed, RandomNumberGenerator, Integer (Int), String, Double, and Array. Table 400 can list numerous types (e.g., Type-E though TypeL).

There can be two kinds of types in the programming language. A first type can have a single canonical representation and the second type can have potentially many descriptors describing this type. If it is an Objective-C class or a Swift type, the programming language will have a single class object or a type-descriptor which is a pointer to the type. Therefore, the type will represent a single piece of data that can be the source of truth for that type. The programming language can include foreign types which are essentially types imported from the C world. This can include C structures like CGPoint and CGRect and CFString. Those are examples of foreign types.

The conformance 408 can list a descriptor or a NULL value for the entries listed by protocol 404 and type 406.

A. Creation of Persistent Index Table for Conformance Checks

Figure 5:
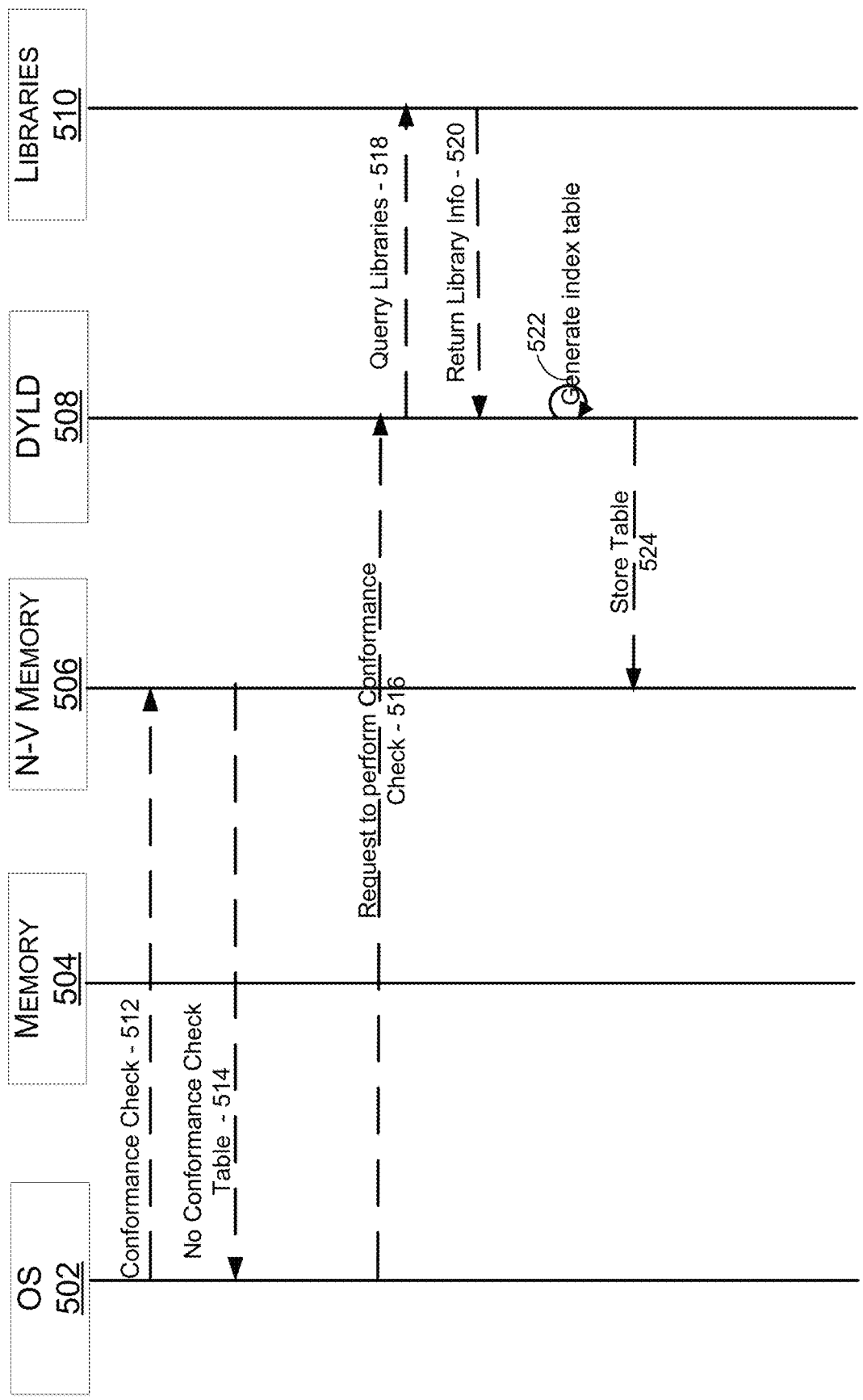
FIG. 5 illustrates an exemplary process for an initial performance of a conformance check.

FIG. 5 illustrates an exemplary process 500 for performing a conformance check. A third-party application (e.g., an App) can be executed on a device. The third-party application can be drafted in a programming language (e.g., SWIFT). The programming language provide real-time feedback to developers and can be seamlessly incorporated into existing Objective-C code. Upon installation or initial execution, the operating system 502 can perform a conformance check.

The conformance check can be performed for a conformance pair. The conformance pair can include a variable type and a particular protocol. A runtime application can perform a first request for a conformance check. The first request can identify a first pointer. A pointer is an object that stores a memory address. In various embodiments, the memory address for the application can change each time it is loaded into memory, but its location relative to a page would be the same. The pointer can indicate the first instruction of the App for the runtime protocol.

At 512, the operating system 502 can check a memory 504 and a non-volatile memory 506 for the existence a protocol and type conformance stored in a memory. The process can include determining a conformance check result is not cached for the conformance pair using the first pointer. The technique can first search for a table 400 as described in FIG. 4 to lookup the conformance values. The conformance check can be a protocol conformance check.

At 514, the operating system 502 can receive information that the table 400 does not exist either in memory 504 or in non-volatile memory 506.

At 516, if the table 400 does not exist in memory 504 or non-volatile memory 506, the operating system 502 can communicate instructions to a dynamic linker/loader 508 to access the one or more libraries 510.

As an example for a particular function can have the form:

---
func log(value: Any) {if let value = value as? CustomStringConvertible {puts(value.description)}}

---

This function can take a value of any type (e.g., a string, an integer, data, an image, etc.). The conformance check can determine if this value conforms to the CustomStringConvertible protocol, which is part of the programming language (e.g., Swift) standard library. The CustomStringConvertible protocol can include a property called "description," which can return some textual representation of the value. If the value conforms to this protocol, the function call puts( ) with the result of the value's description property.

A conformance check can be provided as follows in the code:

---
extension WidgetHolder: CustomStringConvertible {
    var description: String {return "WidgetHolder with \(widgetCount) widgets"}}

---

In this example, the conformance check can be the that "as?" operator in the if statement. That operator can be a conditional cast operator, and conformance check can occur when the operating system performs a conditional cast to a protocol. The conformance check can produce two results. A first result can be a yes/no answer as to whether the value conforms. In the above code, if value is a WidgetHolder, this will say the first result will be "yes". If the value is some other type that has no conformance, this result will be "no." A second result of the conformance check can be a witness table describing how the value conforms. In the above code, if value is a WidgetHolder, this table can contain a pointer to the implementation of the "description" above. When the compiler sees one of these "as?" operators, there are three things that it can return in the resulting machine code. First, the compiler may have enough knowledge at compile time (if all the types and protocols are visible to it in the source that the compiler is currently building) to know what the result is already. In this case, the compiler will directly return the "yes" or "no" and the witness table, as needed, into the machine code.

If the compiler does not know the answer, it may still know a fast way to obtain the answer. For example, based on the code visible to the compiler, the compiler may know for certain that there is only one type that conforms to this protocol. In that case, the compiler can return a small chunk of code to check whether the value is that type or some other type, and produce the appropriate answer.

The compiler may not know the answer and does not know any fast way to obtain the answer based on the information at hand. In that case, the compiler can return a call into the runtime. For example, there can be specific programming language commands (e.g., swift_conformsToProtocol to call specifically for protocol conformance checks, and a swift_dynamicCast call for general casts, and a few other special cases.) The returned code can pass the value and the type to check to the runtime, and the runtime will return the answer. This may occur frequently in real-world programming languages (e.g., Swift code.) This can be called any time during programming language (e.g., Swift) code runs. The log( ) call could be all over a program's codebase. This process can occur often at startup, but continues to happen afterwards too. And case 3, the technique includes speeding up the process with the dynamic linker/loader 508 integration.

At 518, the dynamic linker/loader 508 can query the one or more libraries 510 to retrieve library information. The dynamic linker/loader 508 can perform the conformance check for the conformance pair and store a result of the conformance check in an index table in persistent cache in association with at least a portion of bits in the first pointer.

The dynamic linker/loader 508 can call functions of the library (e.g., a libSwift) when the Application needs it. Here, some of the library functions can use the dynamic linker/loader 508 to perform certain tasks. For example, the dynamic linker/loader 508 can parse the executable and its dependent libraries at launch and store the results of in a table. Then, at runtime during the execution/lifetime of the process, the dynamic linker/loader 508 can perform the parsing to determine whether or not the dynamic linker/loader 508 has specific information about a protocol and type in everything it has parsed/computed before, so that the protocol conformance check can be performed faster.

That "querying" can be done through function calls into the dynamic linker/loader 508. The library routine can communicate to the dynamic linker/loader 508 specifically which protocol and type that the library routine is looking information for, and the dynamic linker/loader can return an answer as the return value of the function. The library routine can then use the return value to continue doing the rest of its internal work. This function can be referred to as the dyld API.

At 520, the libraries 510 can return library information containing the number, size, and information stored in the libraries. The dynamic linker/loader can index the table to make locating results for certain entries faster. The table can be a lookup table or a HashMap that allows for direct lookup as opposed to reviewing a linear list of entries. The keys for the HashMap can be the protocol being looked up and something that identifies the type of entry being looked up. These keys can be used as the index and the result or stored values can be the conformance or list of conformances.

At 522, the dynamic linker/loader 508 can generate an index table of library information. The table can be generated using the programming language compiler.

At 524, the table can be stored in a non-volatile memory 506.

The tables that are generated for the App need to be resilient to the fact that the App may be located anywhere else in memory during subsequent executions. In addition, all the libraries that make up the App may be in different locations as well. The tables that are constructed to be resilient and accessible as the App and libraries move around in memory between launches.

B. Index Table With Low Bits for Page Alignments

As illustrated in FIG. 4, the table 400 can be indexed using a predetermined number of low bits (e.g., last 12 bits) for page alignment. Certain programming languages (e.g., Swift) can use an arbitrary pointer since the various libraries are page aligned. Alignment describes how much memory is needed to store values in memory. Size is the number of bytes needed to store the type usually the sum of all the strides. A stride represents the distance between two elements in the memory.

Information stored in libraries can be page aligned to a defined page size (e.g., 16K page). Being page aligned means if the operating system loads a library now and at a future point in time (e.g., 5 minutes later), the low bits of that library can be page aligned. The low bits of every pointer in that library can be the same. Each pointer in a library can have different high bits. The pertinent thing can be that any given pointer can have the same low bits regardless of where the pointer is loaded in memory, because only the high bits vary when loading libraries in a different location. Therefore, the predetermined number of low bits 402 (e.g., last 12 bits) can be used as an index for the various protocol properties. The low bits 402 can be used as keys in the table 400. As the low bits 402 of the table 400 can be the same for different protocol/type pairs, there can be collisions in retrieving the conformance results. This means that instead of having one answer for a given low bit 402 value, there can be two, three, or four results. But these few results can be easier to analyze than a linear search of the entire table. Collisions can be resolved by storing multiple results, and then searching among those multiple results by examining the full pointers rather than just the low bits. This can be a two-step process. The first step can include a fast lookup using low bits as the key to narrow down to a few possible answers. The second step can be choosing the correct answer from the few possible answers by using all bits.

As the runtime operation searches through the table 400 for the particular number of low bit values it may find multiple protocols that share the same number of low bits. In this case, the runtime operation will search both low bit 402 entries in table 400 for the correct protocol or type.

The conformances can be identified by pointer or by name. Multiple tables 400 can be generated. For example, a table 400 can be built for the pointer case and a separate table can be generated for the name case. The programming language can include different APIs that can use either pointers or names.

C. Use of Persistent Index Table for Conformance Checks

After the persistent index table is created, a second request for the conformance check for the conformance pair can be received. The second request can include a second pointer. Upon determining that the conformance pair is cached in the memory, the electronic device can find the result stored in the memory using the pointer can load the conformance into the working memory. Because the result for the conformance pair is mapped to the disc it does not need to "dirty" the memory because the operating system can always access it again later rather than staying in the physical memory until the application is terminated.

In response to determining that the conformance check result is cached for the conformance pair, retrieving the conformance check result from the index table in the persistent cache, where retrieving the conformance check result uses at least a portion of the bits in the second pointer.

The pointer can be aligned to the same boundaries every launch even if the pointers are at different memory addresses. In various embodiments, the techniques can take a low bit of those addresses as keys in the table so that even if the actual pointer is different, the key will remain the same meaning because the last predetermined number of bits (e.g., last 12 bits) can be the same across multiple launches. Those predetermined number of bits can be used as the key to finding the values in the memory. This can provide a list of possible values that can be returned to the open language protocol. In various embodiments, there can be multiple values returned but it will be faster than a single linear table to review.

Figure 6:
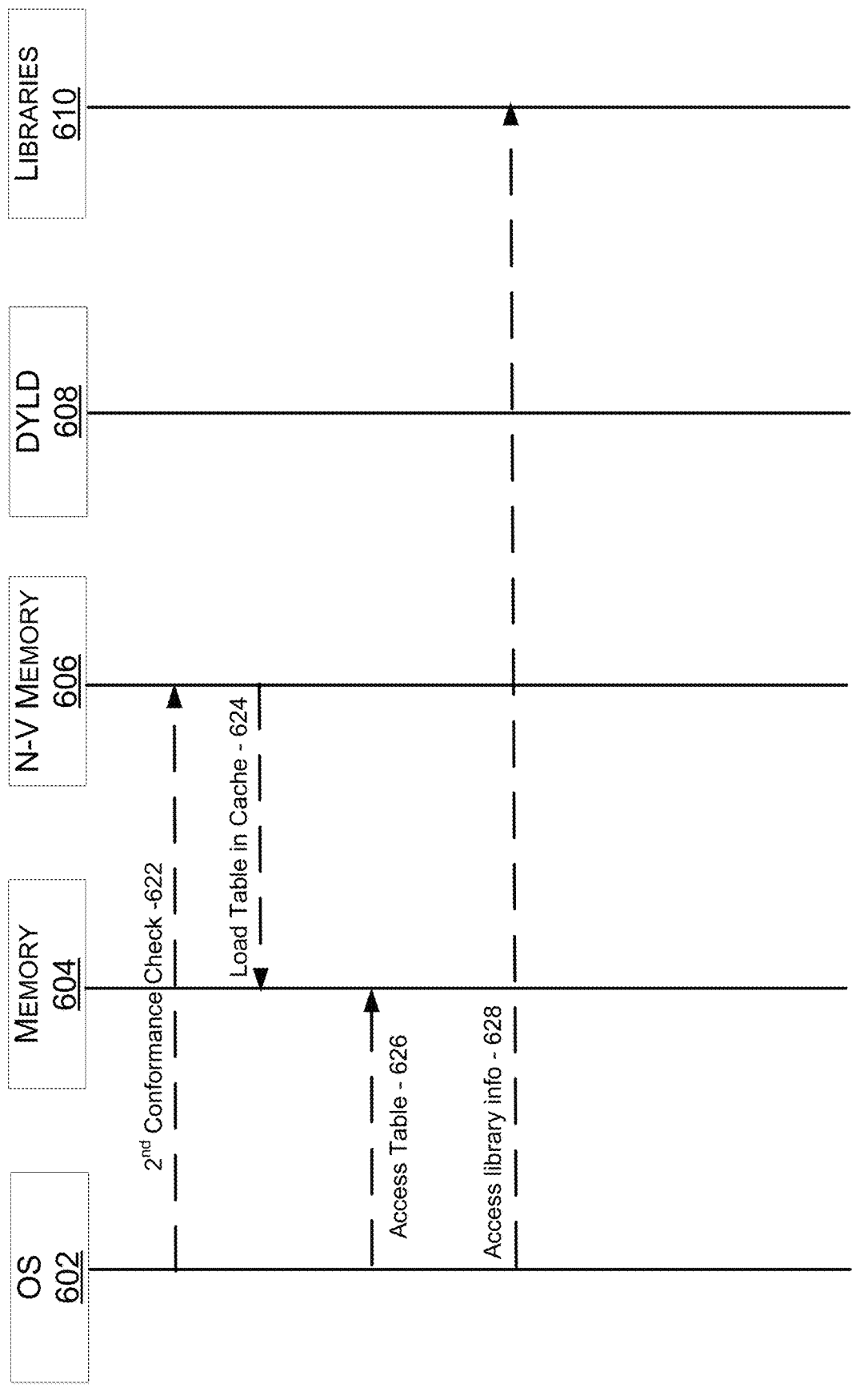
FIG. 6 illustrates an exemplary process for subsequent performance of a conformance check.

FIG. 6 illustrates an exemplary process for subsequent performance of a conformance check. The subsequent conformance check can be done on reboot of the electronic, a second launch of the App, or it may occur during routine execution of the App following the first launch.

At 622, on subsequent requests for a conformance check, the operating system (OS) 602 can check to see if a table 400 exists in memory 604 or in non-volatile memory 606. The conformance check can be a protocol conformance check.

At 624, if the table 400 exists in non-volatile memory 606, the table can be loaded into memory 604.

At 626, the runtime process of the operating system 602 can access the table to search for ensure that the variable complies with the conformance. The conformance check result can be obtained by accessing a conformance cache table in a memory of the electronic device. The conformance cache table can store results for particular values (e.g., a string, an Int, an array). The runtime process can access library information stored in the libraries 610 using the pointers in the table.

IV. Exemplary Flow

FIG. 7 is a flow chart of a process 700, according to an example of the present disclosure. According to an example, one or more process blocks of FIG. 7 may be performed by electronic device 800.

At block 705, process 700 may include receiving a first request for a conformance check for a conformance pair, the conformance pair include a variable type and a particular protocol, the first request identifying a first pointer. The conformance check can be a protocol conformance check. For example, electronic device 800 may receive a first request for a conformance check for a conformance pair, the conformance pair include a variable type and a particular protocol, the first request identifying a first pointer, as described above.

The request for the conformance check can originate from execution of an application on the electronic device. A pointer is an object that stores a memory address. In various embodiments, the pointer can be specific to the application but can change with each app launch.

In various embodiments, the conformance pair may include a type pointer and a protocol pointer. A type pointer points to data that represents the type at runtime. This can include things like (1) What kind of type is this? Struct, enum, class, etc., (2) The type's name and (3) Methods and properties on the type. Similarly, a protocol pointer can point to data that represents the protocol at runtime. This can include the protocol's name and requirements.

At block 710, process 700 may include determining a conformance check result is not cached for the conformance pair using the first pointer. For example, electronic device 800 may determine a conformance check result is not cached for the conformance pair using the first pointer, where determining the conformance check result is not cached, as described above.

In various embodiments, the determining the conformance check result can be performed by accessing a conformance cache table in a memory of the electronic device. The conformance cache table can store results for particular values (e.g., a string, an Int, an array).

At block 715, process 700 may include, in response to determining that the conformance check result is not cached for a variable, performing the conformance check for the conformance pair and storing a result of the conformance check in an index table in persistent cache in association with at least a portion of bits in the first pointer. For example, electronic device 800 may in response to determine that the conformance check result is not cached for a variable, performing the conformance check for the conformance pair and storing a result of the conformance check in an index table in persistent cache in association with at least a portion of bits in the first pointer, as described above.

In various embodiments, the table can be constructed by a system routine, such as a dynamic linker/loader. The dynamic linker/loader can index the table to make locating results for certain entries faster. The table can be a lookup table or a HashMap that allows for direct lookup as opposed to reviewing a linear list of entries. The keys for the HashMap can be the protocol being looked up and something that identifies the type of entry being looked up. These keys can be used as the index and the result or stored values can be the conformance or list of conformances. For example, some protocols that can include but are not limited to Equatable, Hashable, and CustomStringConvertible. There can be a single result in the table that conforms to the protocols of Double, Equatable, and Int. For example, for Equatable there can be a pointer to the code that actually performs the comparison.

In various embodiments, a dynamic linker/loader can be used to access one or more stored libraries and generate a table in cache for storing results for the variables. The dynamic linker/loader can scan the third-party application and any associated libraries to construct tables that can be persisted for subsequent conformance checks. In this way, the persistent cache can persist across application launches. The table can be constructed on first installation or first execution of the application on the electronic device. The dynamic linker/loader can scan the list of conformances associated with the application and constructs a table to enable the application to look up and access various results faster by indexing the results ahead of time.

The tables that are generated for the App need to be resilient to the fact that the App may be located somewhere else in memory during subsequent executions. In addition, all the libraries that make up the App may be in different locations as well. The tables that are constructed to be resilient and accessible as the App and libraries move around in memory between launches.

At block 720, process 700 may include receiving a second request for the conformance check for the conformance pair, the second request including a second pointer. For example, electronic device 800 may receive a second request for the conformance check for the conformance pair, the second request including a second pointer, as described above.

In various embodiments, the conformance check can include searching for a conformance that matches a given type and protocol. The conformance check can produce a witness table that describes the given type's conformance to that protocol or a null value if the given type does not conform to the protocol. The use of the table can effectively accelerate positive and negative lookups without having to run through the libraries.

Upon determining that the conformance pair is cached in the memory, the electronic device can find the result stored in the memory using the pointer can load the conformance into the working memory. Because the result for the conformance pair is mapped to the disc it does not need to "dirty" the memory because the operating system can always access it again later rather than staying in the physical memory until the application is terminated.

At block 725, process 700 may include determining that the conformance check result is cached in the persistent cache for the conformance pair. For example, electronic device 800 may determine that the conformance check result is cached in the persistent cache for the conformance pair, as described above.

At block 730, process 700 may include in response to determining that the conformance check result is cached for the conformance pair, retrieving the conformance check result from the index table in the persistent cache, where retrieving the conformance check result uses at least a portion of the bits in the second pointer. For example, electronic device 800 may in response to determine that the conformance check result is cached for the conformance pair, retrieving the conformance check result from the index table in the persistent cache, where retrieving the conformance check result uses at least a portion of the bits in the second pointer, as described above.

The pointer can be aligned to the same boundaries every launch even if the pointers are at different memory addresses. In various embodiments, the techniques can take a low bit of those addresses as keys in the table so that even if the actual pointer is different, the key will remain the same meaning because the last predetermined number of bits (e.g., last 12 bits) can be the same across different pointers. Those predetermined number of bits can be used as the key to finding the values in the memory. This can provide a list of possible values that can be returned to the open language protocol. In various embodiments, there can be multiple values returned but it will be faster than a single linear table to review.

If the process has not been accelerated by indexing the table, the programming language would have provided a pointer to a protocol to a memory location. The process still would have required determination of which of the libraries are loaded and which library is the pointer directing to. This process without the index may require a time-consuming linear scan.

The programming language can provide an arbitrary pointer because the system is page aligned to a 16K page. If the system loads a library now and then it loads a library an arbitrary amount of time later (e.g., five minutes), the low bits of the library will be page aligned. The low bits of every pointer in that library can be the same whether if it is loaded now or in the future because of the alignment. The low predetermined number of bits can be masked off and used to look up various libraries.

In various embodiments, there is not only a protocol pointer but also a type pointer. The low bits from each of the protocol pointer and the type pointer can be used to locate results in the memory. The protocol pointer and type pointer can be used as a node that can be quickly searched. If there is no hit (or no results saved for the node) the conformance check can quickly return a null value. In effect, the conformance table can be a Bloom filter or a very quick way of determining if something is stored or not. If there is a hit, there may be only a very small number of results, two or three results, and that can searched upon to see if the hit is valid or not. In effect, the low predetermined number of but can inform the App where in that 16K page the pointer would be if the page location is known.

In various embodiments, the libraries can be indexed using a protocol pointer and a type pointer. There can be a few variations of the type pointer. In various embodiments, the type pointer may be a string. In various embodiments, the type pointer may be a class object.

The type pointer can be known by the programming language (e.g., SWIFT) runtime because when the App requests a conformance check it can pass the type of pointer that is being checked to the dynamic linker/loader. The protocol pointer and type pointer may be stored together in the same memory location, but each can point to different libraries. The protocol can be in one library. The class or type can be in another library. The conformance can be in another library.

In various embodiments, the dynamic linker/loader turns a pointer to the protocol conformance itself. The conformance descriptor can include pointers to the implementation that tells the App how to compare two objects or whatever the protocol does. The dynamic linker/loader can use the keys to speed up the lookup, but then once the system returns an array of values, the system would access the values to see if there is an exact match on the pointer.

Process 700 may include additional implementations, such as any single implementation or any combination of implementations described below and/or in connection with one or more other processes described elsewhere herein. In a first implementation, the portion of the bits are shared across one or more conformance pairs, resulting in a plurality of matching conformance pairs in the index table, the method further includes identifying the conformance pair from the plurality of matching conformance pairs.

In various embodiments, process 700 further includes storing a hash table mapping type descriptor and protocol pairs to protocol conformance descriptors; generating one or more witness tables into a shared cache; and generating one or more generic witness tables for pre-specialized metadata.

In various embodiments, process 700 further includes caching one or more witness tables using a protocol or a type as a key.

In various embodiments, the method is performed by a dynamic linker that is configured to perform one or more processes and persist results of the one or more processes in a non-volatile storage.

In various embodiments, the one or more processes are specified by an application or run-time, the application or run-time retrieves the results from the non-volatile storage, and the results are persisted across launches of the application and/or runtime.

It should be noted that while FIG. 7 shows example blocks of process 700, in some implementations, process 700 may include additional blocks, fewer blocks, different blocks, or differently arranged blocks than those depicted in FIG. 7. Additionally, or alternatively, two or more of the blocks of process 700 may be performed in parallel.

V. Example Device

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

Figure 8:
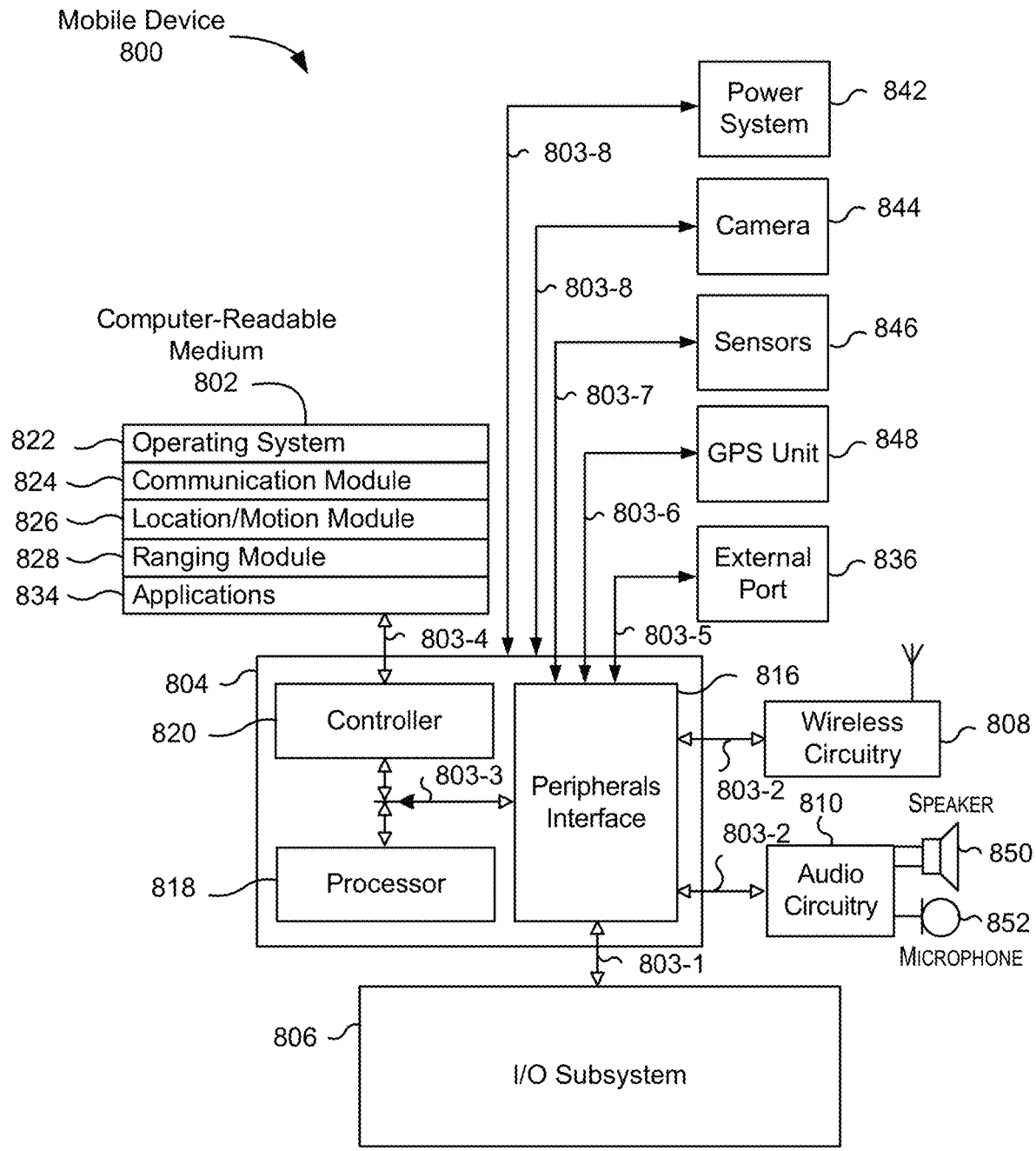
FIG. 8 is a block diagram of an example electronic device.

FIG. 8 is a block diagram of an example electronic device 800. Device 800 generally includes computer-readable medium 802, a processing system 804, an Input/Output (I/O) subsystem 806, wireless circuitry 808, and audio circuitry 810 including speaker 812 and microphone 814. These components may be coupled by one or more communication buses or signal lines 803. Device 800 can be any portable electronic device, including a handheld computer, a tablet computer, a mobile phone, laptop computer, tablet device, media player, personal digital assistant (PDA), a key fob, a car key, an access card, a multifunction device, a mobile phone, a portable gaming device, a headset, or the like, including a combination of two or more of these items.

It should be apparent that the architecture shown in FIG. 8 is only one example of an architecture for device 800, and that device 800 can have more or fewer components than shown, or a different configuration of components. The various components shown in FIG. 8 can be implemented in hardware, software, or a combination of both hardware and software, including one or more signal processing and/or application specific integrated circuits.

Wireless circuitry 808 is used to send and receive information over a wireless link or network to one or more other devices' conventional circuitry such as an antenna system, a radio frequency (RF) transceiver, one or more amplifiers, a tuner, one or more oscillators, a digital signal processor, a coder-decoder (CODEC) chipset, memory, etc. Wireless circuitry 808 can use various protocols, e.g., as described herein. In various embodiments, wireless circuitry 808 is capable of establishing and maintaining communications with other devices using one or more communication protocols, including time division multiple access (TDMA), code division multiple access (CDMA), global system for mobile communications (GSM), Enhanced Data GSM Environment (EDGE), wideband code division multiple access (W-CDMA), Long Term Evolution (LTE), LTE-Advanced, Wi-Fi (such as Institute of Electrical and Electronics Engineers (IEEE) 802.11a, IEEE 802.11b, IEEE 802.11g and/or IEEE 802.11n), Bluetooth, Wi-MAX, Voice Over Internet Protocol (VoIP), near field communication protocol (NFC), a protocol for email, instant messaging, and/or a short message service (SMS), or any other suitable communication protocol, including communication protocols not yet developed as of the filing date of this document.

Wireless circuitry 808 is coupled to processing system 804 via peripherals interface 816. Peripherals interface 816 can include conventional components for establishing and maintaining communication between peripherals and processing system 804. Voice and data information received by wireless circuitry 808 (e.g., in speech recognition or voice command applications) is sent to one or more processors 818 via peripherals interface 816. One or more processors 818 are configurable to process various data formats for one or more application programs 834 stored on medium 802.

Peripherals interface 816 couple the input and output peripherals of device 800 to the one or more processors 818 and computer-readable medium 802. One or more processors 818 communicate with computer-readable medium 802 via a controller 820. Computer-readable medium 802 can be any device or medium that can store code and/or data for use by one or more processors 818. Computer-readable medium 802 can include a memory hierarchy, including cache, main memory and secondary memory. The memory hierarchy can be implemented using any combination of a random-access memory (RAM) (e.g., static random access memory (SRAM,) dynamic random access memory (DRAM), double data random access memory (DDRAM)), read only memory (ROM), FLASH, magnetic and/or optical storage devices, such as disk drives, magnetic tape, CDs (compact disks) and DVDs (digital video discs). In some embodiments, peripherals interface 816, one or more processors 818, and controller 820 can be implemented on a single chip, such as processing system 804. In some other embodiments, they can be implemented on separate chips.

Processor(s) 818 can include hardware and/or software elements that perform one or more processing functions, such as mathematical operations, logical operations, data manipulation operations, data transfer operations, controlling the reception of user input, controlling output of information to users, or the like. Processor(s) 818 can be embodied as one or more hardware processors, microprocessors, microcontrollers, field programmable gate arrays (FPGAs), application-specified integrated circuits (ASICs), or the like.

Device 800 also includes a power system 842 for powering the various hardware components. Power system 842 can include a power management system, one or more power sources (e.g., battery, alternating current (AC)), a recharging system, a power failure detection circuit, a power converter or inverter, a power status indicator (e.g., a light emitting diode (LED)) and any other components typically associated with the generation, management and distribution of power in mobile devices.

In some embodiments, device 800 includes a camera 844. In some embodiments, device 800 includes sensors 846. Sensors can include accelerometers, compass, gyrometer, pressure sensors, audio sensors, light sensors, barometers, and the like. Sensors 846 can be used to sense location aspects, such as auditory or light signatures of a location.

In some embodiments, device 800 can include a GPS receiver, sometimes referred to as a GPS unit 848. A mobile device can use a satellite navigation system, such as the Global Positioning System (GPS), to obtain position information, timing information, altitude, or other navigation information. During operation, the GPS unit can receive signals from GPS satellites orbiting the Earth. The GPS unit analyzes the signals to make a transit time and distance estimation. The GPS unit can determine the current position (current location) of the mobile device. Based on these estimations, the mobile device can determine a location fix, altitude, and/or current speed. A location fix can be geographical coordinates such as latitudinal and longitudinal information.

One or more processors 818 run various software components stored in medium 802 to perform various functions for device 800. In some embodiments, the software components include an operating system 822, a communication module 824 (or set of instructions), a location module 826 (or set of instructions), a ranging module 828 that is used as part of ranging operation described herein, and other application programs 834 (or set of instructions).

Operating system 822 can be any suitable operating system, including iOS, Mac OS, Darwin, Real Time Operating System (RTXC), LINUX, UNIX, OS X, WINDOWS, or an embedded operating system such as VxWorks. The operating system can include various procedures, sets of instructions, software components and/or drivers for controlling and managing general system tasks (e.g., memory management, storage device control, power management, etc.) and facilitates communication between various hardware and software components.

Communication module 824 facilitates communication with other devices over one or more external ports 836 or via wireless circuitry 808 and includes various software components for handling data received from wireless circuitry 808 and/or external port 836. External port 836 (e.g., universal serial bus (USB), FireWire, Lightning connector, 60-pin connector, etc.) is adapted for coupling directly to other devices or indirectly over a network (e.g., the Internet, wireless local area network (LAN), etc.).

Location/motion module 826 can assist in determining the current position (e.g., coordinates or other geographic location identifiers) and motion of device 800. Modern positioning systems include satellite-based positioning systems, such as Global Positioning System (GPS), cellular network positioning based on "cell IDs," and Wi-Fi positioning technology based on a Wi-Fi networks. GPS also relies on the visibility of multiple satellites to determine a position estimate, which may not be visible (or have weak signals) indoors or in "urban canyons." In some embodiments, location/motion module 826 receives data from GPS unit 848 and analyzes the signals to determine the current position of the mobile device. In some embodiments, location/motion module 826 can determine a current location using Wi-Fi or cellular location technology. For example, the location of the mobile device can be estimated using knowledge of nearby cell sites and/or Wi-Fi access points with knowledge also of their locations. Information identifying the Wi-Fi or cellular transmitter is received at wireless circuitry 808 and is passed to location/motion module 826. In some embodiments, the location module receives the one or more transmitter IDs. In some embodiments, a sequence of transmitter IDs can be compared with a reference database (e.g., Cell ID database, Wi-Fi reference database) that maps or correlates the transmitter IDs to position coordinates of corresponding transmitters, and computes estimated position coordinates for device 800 based on the position coordinates of the corresponding transmitters. Regardless of the specific location technology used, location/motion module 826 receives information from which a location fix can be derived, interprets that information, and returns location information, such as geographic coordinates, latitude/longitude, or other location fix data Ranging module 828 can send/receive ranging messages to/from an antenna, e.g., connected to wireless circuitry 808. The messages can be used for various purposes, e.g., to identify a sending antenna of a device, determine timestamps of messages to determine a distance of mobile device 800 from another device. Ranging module 828 can exist on various processors of the device, e.g., an always-on processor (AOP), a UWB chip, and/or an application processor. For example, parts of ranging module 828 can determine a distance on an AOP, and another part of the ranging module can interact with a sharing module, e.g., to display a position of the other device on a screen in order for a user to select the other device to share a data item. Ranging module 828 can also interact with a reminder module that can provide an alert based on a distance from another mobile device.

The one or more applications 834 on device 800 can include any applications installed on the device 800, including without limitation, a browser, address book, contact list, email, instant messaging, social networking, word processing, keyboard emulation, widgets, JAVA-enabled applications, encryption, digital rights management, voice recognition, voice replication, a music player (which plays back recorded music stored in one or more files, such as MP3 or AAC files), etc.

There may be other modules or sets of instructions (not shown), such as a graphics module, a time module, etc. For example, the graphics module can include various conventional software components for rendering, animating and displaying graphical objects (including without limitation text, web pages, icons, digital images, animations and the like) on a display surface. In another example, a timer module can be a software timer. The timer module can also be implemented in hardware. The time module can maintain various timers for any number of events.

I/O subsystem 806 can be coupled to a display system (not shown), which can be a touch-sensitive display. The display displays visual output to the user in a graphical user interface (GUI). The visual output can include text, graphics, video, and any combination thereof. Some or all of the visual output can correspond to user-interface objects. A display can use LED (light emitting diode), LCD (liquid crystal display) technology, or LPD (light emitting polymer display) technology, although other display technologies can be used in other embodiments.

In some embodiments, I/O subsystem 806 can include a display and user input devices such as a keyboard, mouse, and/or trackpad. In some embodiments, I/O subsystem 806 can include a touch-sensitive display. A touch-sensitive display can also accept input from the user based at least part on haptic and/or tactile contact. In some embodiments, a touch-sensitive display forms a touch-sensitive surface that accepts user input. The touch-sensitive display/surface (along with any associated modules and/or sets of instructions in computer-readable medium 802) detects contact (and any movement or release of the contact) on the touch-sensitive display and converts the detected contact into interaction with user-interface objects, such as one or more soft keys, that are displayed on the touch screen when the contact occurs. In some embodiments, a point of contact between the touch-sensitive display and the user corresponds to one or more digits of the user. The user can make contact with the touch-sensitive display using any suitable object or appendage, such as a stylus, pen, finger, and so forth. A touch-sensitive display surface can detect contact and any movement or release thereof using any suitable touch sensitivity technologies, including capacitive, resistive, infrared, and surface acoustic wave technologies, as well as other proximity sensor arrays or other elements for determining one or more points of contact with the touch-sensitive display.

Further, I/O subsystem 806 can be coupled to one or more other physical control devices (not shown), such as pushbuttons, keys, switches, rocker buttons, dials, slider switches, sticks, LEDs, etc., for controlling or performing various functions, such as power control, speaker volume control, ring tone loudness, keyboard input, scrolling, hold, menu, screen lock, clearing and ending communications and the like. In some embodiments, in addition to the touch screen, device 800 can include a touchpad (not shown) for activating or deactivating particular functions. In some embodiments, the touchpad is a touch-sensitive area of the device that, unlike the touch screen, does not display visual output. The touchpad can be a touch-sensitive surface that is separate from the touch-sensitive display, or an extension of the touch-sensitive surface formed by the touch-sensitive display.

In some embodiments, some or all of the operations described herein can be performed using an application executing on the user's device. Circuits, logic modules, processors, and/or other components may be configured to perform various operations described herein. Those skilled in the art will appreciate that, depending on implementation, such configuration can be accomplished through design, setup, interconnection, and/or programming of the particular components and that, again depending on implementation, a configured component might or might not be reconfigurable for a different operation. For example, a programmable processor can be configured by providing suitable executable code; a dedicated logic circuit can be configured by suitably connecting logic gates and other circuit elements; and so on.

Any of the software components or functions described in this application, may be implemented as software code to be executed by a processor using any suitable computer language such as, for example, Java, C++ or Perl using, for example, conventional or object-oriented techniques. The software code may be stored as a series of instructions, or commands on a computer readable medium for storage and/or transmission, suitable media include random access memory (RAM), a read only memory (ROM), a magnetic medium such as a hard-drive or a floppy disk, or an optical medium such as a compact disk (CD) or DVD (digital versatile disk), flash memory, and the like. The computer readable medium may be any combination of such storage or transmission devices.

Such programs may also be encoded and transmitted using carrier signals adapted for transmission via wired, optical, and/or wireless networks conforming to a variety of protocols, including the Internet. As such, a computer readable medium according to an embodiment of the present disclosure may be created using a data signal encoded with such programs. Computer readable media encoded with the program code may be packaged with a compatible device or provided separately from other devices (e.g., via Internet download). Any such computer readable medium may reside on or within a single computer program product (e.g., a hard drive or an entire computer system), and may be present on or within different computer program products within a system or network. A computer system may include a monitor, printer, or other suitable display for providing any of the results mentioned herein to a user.

Computer programs incorporating various features of the present disclosure may be encoded on various computer readable storage media; suitable media include magnetic disk or tape, optical storage media, such as compact disk (CD) or DVD (digital versatile disk), flash memory, and the like. Computer readable storage media encoded with the program code may be packaged with a compatible device or provided separately from other devices. In addition, program code may be encoded and transmitted via wired optical, and/or wireless networks conforming to a variety of protocols, including the Internet, thereby allowing distribution, e.g., via Internet download. Any such computer readable medium may reside on or within a single computer product (e.g., a solid-state drive, a hard drive, a CD, or an entire computer system), and may be present on or within different computer products within a system or network. A computer system may include a monitor, printer, or other suitable display for providing any of the results mentioned herein to a user.

As described above, one aspect of the present technology is the gathering, sharing, and use of data, including an authentication tag and data from which the tag is derived. The present disclosure contemplates that in some instances, this gathered data may include personal information data that uniquely identifies or can be used to contact or locate a specific person. Such personal information data can include demographic data, location-based data, telephone numbers, email addresses, twitter ID's, home addresses, data or records relating to a user's health or level of fitness (e.g., vital signs measurements, medication information, exercise information), date of birth, or any other identifying or personal information.

The present disclosure recognizes that the use of such personal information data, in the present technology, can be used to the benefit of users. For example, the personal information data can be used to authenticate another device, and vice versa to control which devices ranging operations may be performed. Further, other uses for personal information data that benefit the user are also contemplated by the present disclosure. For instance, health and fitness data may be shared to provide insights into a user's general wellness or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of sharing content and performing ranging, the present technology can be configured to allow users to select to "opt in" or "opt out" of participation in the collection of personal information data during registration for services or anytime thereafter. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data a city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data.

Systems and methods for dynamically loading object modules are described herein. In the following description, numerous specific details are set forth. However, it is understood that embodiments of the invention may be practiced without these specific details. In other instances, well-known circuits, structures and techniques have not been shown in detail in order not to obscure the understanding of this description. Note that in this description, references to "one embodiment" or "an embodiment" mean that the feature being referred to is included in at least one embodiment of the invention. Further, separate references to "one embodiment" in this description do not necessarily refer to the same embodiment; however, neither are such embodiments mutually exclusive, unless so stated and except as will be readily apparent to those of ordinary skill in the art. Thus, the present invention can include any variety of combinations and/or integrations of the embodiments described herein. Moreover, in this description, the phrase "exemplary embodiment" means that the embodiment being referred to serves as an example or illustration.

Herein, block diagrams illustrate exemplary embodiments of the invention. Also herein, flow diagrams illustrate operations of the exemplary embodiments of the invention. The operations of the flow diagrams will be described with reference to the exemplary embodiments shown in the block diagrams. However, it should be understood that the operations of the flow diagrams could be performed by embodiments of the invention other than those discussed with reference to the block diagrams, and embodiments discussed with references to the block diagrams could perform operations different than those discussed with reference to the flow diagrams.

Although the present disclosure has been described with respect to specific embodiments, it will be appreciated that the disclosure is intended to cover all modifications and equivalents within the scope of the following claims.

All patents, patent applications, publications, and descriptions mentioned herein are incorporated by reference in their entirety for all purposes. None is admitted to be prior art.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. The phrase "based on" should be understood to be open-ended, and not limiting in any way, and is intended to be interpreted or otherwise read as "based at least in part on," where appropriate. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure. The use of "or" is intended to mean an "inclusive or," and not an "exclusive or" unless specifically indicated to the contrary. Reference to a "first" component does not necessarily require that a second component be provided. Moreover, reference to a "first" or a "second" component does not limit the referenced component to a particular location unless expressly stated. The term "based on" is intended to mean "based at least in part on."

Disjunctive language such as the phrase "at least one of X, Y, or Z," unless specifically stated otherwise, is otherwise understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Additionally, conjunctive language such as the phrase "at least one of X, Y, and Z," unless specifically stated otherwise, should also be understood to mean X, Y, Z, or any combination thereof, including "X, Y, and/or Z."

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate, and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

The specific details of particular embodiments may be combined in any suitable manner or varied from those shown and described herein without departing from the spirit and scope of embodiments of the disclosure.

The above description of exemplary embodiments of the disclosure has been presented for the purposes of illustration and description. It is not intended to be exhaustive or to limit the disclosure to the precise form described, and many modifications and variations are possible in light of the teaching above. The embodiments were chosen and described in order to best explain the principles of the disclosure and its practical applications to thereby enable others skilled in the art to best utilize the disclosure in various embodiments and with various modifications as are suited to the particular use contemplated.

All references, including publications, patent applications, and patents, cited herein are hereby incorporated by reference to the same extent as if each reference were individually and specifically indicated to be incorporated by reference and were set forth in its entirety herein.

What is claimed is:

1. A method performed by an electronic device, the method comprising:
    receiving, for an application or run-time, a first request for a conformance check for a conformance pair, the conformance pair include a variable type and a particular protocol of a programming language of the application or run-time, the first request identifying a first pointer;
    determining, using the variable type and the particular protocol as a cache key, that a conformance check result is not cached for the conformance pair using the first pointer;
    in response to determining that the conformance check result is not cached for a variable, performing the conformance check for the conformance pair and storing a result of the conformance check in an index table in persistent cache in association with a predetermined number of low bits in the first pointer;
    receiving a second request for the conformance check for the conformance pair, the second request including a second pointer;
    determining, using the cache key, that the conformance check result is cached in the persistent cache for the conformance pair;
    in response to determining that the conformance check result is cached for the conformance pair, retrieving the conformance check result from the index table in the persistent cache, wherein retrieving the conformance check result uses the predetermined number of low bits in the second pointer; and launching the application or run-time subject to the conformance check result.

2. The method of claim 1, wherein the predetermined number of low bits are shared across a plurality of conformance pairs, resulting in a plurality of matching conformance pairs in the index table, the method further comprising:

accessing additional bits in the second pointer; and identifying, based on the additional bits, the conformance pair from the plurality of matching conformance pairs.

3. The method of claim 1, wherein the conformance pair comprises a type pointer and a protocol pointer.

4. The method of claim 1, wherein the conformance check comprises:

searching for a conformance that matches a given type and protocol; and generating the index table that describes the given type's conformance to that protocol or a null value if the given type does not conform to the protocol.

5. The method of claim 1, further comprising:

storing a hash table mapping type descriptor and protocol pairs to protocol conformance descriptors;

generating one or more index tables into a shared memory; and generating one or more generic witness tables for pre-specialized metadata.

6. The method of claim 1, wherein the method is performed by a dynamic linker that is configured to perform one or more processes and persist results of the one or more processes in a non-volatile storage.

7. The method of claim 6, wherein the one or more processes are specified by the application or run-time, the application or run-time retrieves the results from the non-volatile storage, and the results are persisted across launches of the application at runtime.

8. The method of claim 1, wherein memory offsets in the index table remain constant regardless of where in memory the application or run-time is stored.

9. A computing device, comprising:

one or more memories; and one or more processors in communication with the one or more memories and configured to execute instructions stored in the one or more memories to perform operations comprising:

receiving, for an application or run-time, a first request for a conformance check for a conformance pair, the conformance pair include a variable type and a particular protocol of a programming language of the application or run-time, the first request identifying a first pointer;

determining, using the variable type and the particular protocol as a cache key, that a conformance check result is not cached for the conformance pair using the first pointer;

in response to determining that the conformance check result is not cached for a variable, performing the conformance check for the conformance pair and storing a result of the conformance check in an index table in persistent cache in association with a predetermined number of low bits in the first pointer;

receiving a second request for the conformance check for the conformance pair, the second request including a second pointer;

determining, using the cache key, that the conformance check result is cached in the persistent cache for the conformance pair;

in response to determining that the conformance check result is cached for the conformance pair, retrieving the conformance check result from the index table in the persistent cache, wherein retrieving the conformance check result uses the predetermined number of low bits in the second pointer; and launching the application or run-time subject to the conformance check result.

10. The computing device of claim 9, wherein the predetermined number of low bits are shared across a plurality of conformance pairs, resulting in a plurality of matching conformance pairs in the index table, the operations further comprising:

accessing additional bits in the second pointer; and identifying, based on the additional bits, the conformance pair from the plurality of matching conformance pairs.

11. The computing device of claim 9, wherein the conformance pair comprises a type pointer and a protocol pointer.

12. The computing device of claim 9, wherein the conformance check comprises:

searching for a conformance that matches a given type and protocol; and generating the index table that describes the given type's conformance to that protocol or a null value if the given type does not conform to the protocol.

13. The computing device of claim 9, wherein the operations further comprise:

storing a hash table mapping type descriptor and protocol pairs to protocol conformance descriptors;

generating one or more index tables into a shared memory; and generating one or more generic witness tables for pre-specialized metadata.

14. The computing device of claim 9, wherein memory offsets in the index table remain constant regardless of where in memory the application or run-time is stored.

15. A non-transitory, computer-readable medium storing a plurality of instructions that, when executed by one or more processors of a computing device, cause the one or more processors to perform operations comprising:

receiving, for an application or run-time, a first request for a conformance check for a conformance pair, the conformance pair include a variable type and a particular protocol of a programming language of the application or run-time, the first request identifying a first pointer;

determining, using the variable type and the particular protocol as a cache key, that a conformance check result is not cached for the conformance pair using the first pointer;

in response to determining that the conformance check result is not cached for a variable, performing the conformance check for the conformance pair and storing a result of the conformance check in an index table in persistent cache in association with a predetermined number of low bits in the first pointer;

receiving a second request for the conformance check for the conformance pair, the second request including a second pointer;

determining, using the cache key, that the conformance check result is cached in the persistent cache for the conformance pair;

in response to determining that the conformance check result is cached for the conformance pair, retrieving the conformance check result from the index table in the persistent cache, wherein retrieving the conformance check result uses the predetermined number of low bits in the second pointer; and launching the application or run-time subject to the conformance check result.

16. The non-transitory, computer-readable medium of claim 15, wherein the predetermined number of low bits are shared across a plurality of conformance pairs, resulting in a plurality of matching conformance pairs in the index table, the operations further comprising:

accessing additional bits in the second pointer; and
identifying, based on the additional bits, the conformance pair from the plurality of matching conformance pairs.

17. The non-transitory, computer-readable medium of claim 15, wherein the conformance pair comprises a type pointer and a protocol pointer.

18. The non-transitory, computer-readable medium of claim 15, wherein the conformance check comprises:

searching for a conformance that matches a given type and protocol; and generating the index table that describes the given type's conformance to that protocol or a null value if the given type does not conform to the protocol.

19. The non-transitory, computer-readable medium of claim 15, wherein the operations further comprise:

storing a hash table mapping type descriptor and protocol pairs to protocol conformance descriptors;

generating one or more index tables into a shared memory; and generating one or more generic witness tables for pre-specialized metadata.

20. The non-transitory, computer-readable medium of claim 15, wherein memory offsets in the index table remain constant regardless of where in memory the application or run-time is stored.

* * * * *

UNITED STATES PATENT AND TRADEMARK OFFICE
CERTIFICATE OF CORRECTION

PATENT NO. : 12,321,269 B2
APPLICATION NO. : 18/085475
DATED : June 3, 2025
INVENTOR(S) : Mohamadou A. Abdoulaye et al.

Page 1 of 1

It is certified that error appears in the above-identified patent and that said Letters Patent is hereby corrected as shown below:

On the Title Page

Item (54) and in the Specification Column 1, Lines 1-3: Please insert --APPLICATIONS-- to the end of the title In the Abstract Item (57): Please delete "The first request can identifying a first pointer" and insert --The first request can identify a first pointer--

Signed and Sealed this
Eighth Day of July, 2025

Coke Morgan Stewart
*Acting Director of the United States Patent and Trademark Office*